United States Patent

[11] 3,587,562

[72] Inventor Andrew S. Williams
Brea, Calif.
[21] Appl. No. 702,410
[22] Filed Feb. 1, 1968
[45] Patented June 28, 1971
[73] Assignee Becton, Dickinson and Company
Rutherford, N.J.

[54] PHYSIOLOGICAL MONITORING SYSTEM
8 Claims, 4 Drawing Figs.

[52] U.S. Cl. .......... 128/2.06, 128/2.08, 128/2.1
[51] Int. Cl. .......... A61b 5/04
[50] Field of Search .......... 128/2.06, 2.08, 2.1

[56] References Cited

UNITED STATES PATENTS

| | | | |
|---|---|---|---|
| 2,661,734 | 12/1953 | Holzer et al. | 128/2.1 |
| 3,347,223 | 10/1967 | Pacela | 128/2.1 |

FOREIGN PATENTS

| | | | |
|---|---|---|---|
| 975,373 | 11/1964 | Great Britain | 128/2.06 |

*Primary Examiner*—William E. Kamm
*Attorney*—Fulwider, Patton, Rieber, Lee and Utecht

ABSTRACT: Electrical apparatus for simultaneously monitoring respiration and cardiac action from a common pair of biopotential electrodes applied to a living subject, to obtain independent respiration and ECG (cardiac) electrical output signals. The respiration signal representing tidal volume impedance changes in the lungs of the subject modulates a constant current high frequency carrier signal and is subsequently amplified, demodulated and filtered in a respiration channel. ECG potentials existing between the common pair of biopotential electrodes are filtered from the modulated high frequency carrier voltage and the filtered ECG signal is then used to modulate a high frequency carrier signal originating from the same source supplying the respiration channel. The ECG modulated carrier is subsequently amplified, demodulated and filtered in a cardiac channel.

INVENTOR.
ANDREW S. WILLIAMS
BY Zulurder, Patton, Rieber Lee and Utecht
ATTORNEYS INVENTOR.
ANDREW S. WILLIAMS
BY Zulwider, Patton, Rieber, Lee, and Utecht
ATTORNEYS INVENTOR.
ANDREW S. WILLIAMS
BY Fulwider, Patton, Rieber, Lee, and Utecht
ATTORNEYS

PHYSIOLOGICAL MONITORING SYSTEM

BACKGROUND OF THE INVENTION

This invention relates generally to improvements in physiological monitoring systems and, more particularly, to a new and improved monitoring apparatus capable of accurately and reliably monitoring respiration and cardiac action.

Respiration action is commonly monitored by means of impedance pneumograph apparatus. In this regard, it is well known in the bioelectrical arts that there is a reliable correlation between lung volume and transthoracic electrical impedance. An accurate reproduction of instantaneous lung volume can be obtained by continuous measurements of this transthoracic impedance at high frequencies.

Cardiac action is conventionally monitored by direct amplification of the differential electrical potential between a pair of suitably located skin electrodes applied to a subject. A conventional electrocardiograph includes a high gain electronic amplifier which drives a pen recorder.

Typical impedance pneumograph and electrocardiograph devices, as well as other electronic equipment for the derivation of small biopotentials encountered in physiological monitoring, usually utilize an arrangement wherein the subject is directly coupled to an electronic amplifier. Such amplifiers, although designed to have a high common mode rejection, generally require a third neutral or "indifferent" electrode connected to ground potential in order to adequately reject unwanted signals, e.g., 60 cycles. However, such a three electrode arrangement inherently poses a potential shock hazard, particularly when the subject is connected to more than one instrument. If any of these instruments has significant leakage current so that a leakage potential can be developed between any one of the instrument electrodes and ground, the subject will receive an electrical shock. The magnitude of the leakage current may or may not reach lethal value, but in any event it is dangerous to the subject and cannot be tolerated in medical equipment. In this connection, it should be noted that an instrument with a leakage path to ground may be quite safe when it is the only instrument connected to the subject, yet the same instrument may pose a substantial threat when used in conjunction with other instruments attached to the subject at the same time.

In view of the foregoing, it will be apparent that, where it is necessary or desirable to monitor several physiological functions simultaneously on a subject, the shock hazard may become a crucial consideration. Hence the capability of monitoring several physiological functions by means of a single instrument utilizing only one set of electrodes would be extremely desirable.

Attempts have been made in the prior art to provide respiration monitoring apparatus which minimizes the shock hazard and requires only two electrodes applied to the subject. One example of such apparatus is disclosed in copending U.S. application Ser. No. 627,097, filed Mar. 30, 1967, for Respiration Monitor, and assigned to the same assignee as the present application. In such two electrode respiration monitoring systems, ECG potentials indicative of cardiac action also appear between the same skin electrodes used to obtain the respiration signal. Unfortunately, however, no means have been provided prior to the present invention for separating the ECG potentials and obtaining a good PQRST cardiac wave free of interfering respiration signals. In this regard, it has heretofore been necessary to utilize a completely independent cardiac monitoring device, with its own electrodes, to sense the ECG potentials and provide classical PQRST output. However, this poses not only the shock hazard previously referred to, but also introduces problems of cost and complexity.

Hence those concerned with the development of bioelectrical physiological monitoring instrumentation have long recognized the need for a new and improved monitoring system capable of simultaneously monitoring respiration and cardiac action from a common pair of biopotential electrodes and capable of providing output waveforms substantially devoid of electrical signal interference. The present invention clearly fulfills this need.

SUMMARY OF THE INVENTION

Briefly, and in general terms, the present invention involves a new and improved cardiac action monitoring device which is capable of simultaneous use with a respiration monitoring device using a common pair of biopotential electrodes. The invention, therefore, involves features of the cardiac monitor, per se, as well as the overall combined respiration and cardiac monitoring system utilizing a single pair of common electrodes.

In a presently preferred embodiment of the overall system, the invention includes a single high frequency oscillator generating a carrier signal which is transformer coupled to a pair of biopotential electrodes applied to the subject, the same pair of subject electrodes being used to derive a respiration signal for the respiration channel of the system and an ECG signal for the cardiac channel of the system.

In the respiration channel, the respiration signal induced by tidal volume variations in transthoracic impedance modulates the high frequency carrier signal and is subsequently amplified, demodulated and filtered. The latter filtered output is the respiration waveform.

In the cardiac channel, the same high frequency carrier signal is coupled through a separate transformer as a first input to an electronic modulator circuit which preferably includes a field effect transistor. The modulator also receives at a second input the signal appearing at the biopotential electrodes, this input being first filtered to reject the modulated carrier signal used for respiration detection and to extract the ECG signal which then modulates the high frequency carrier signal received through the first input. The ECG modulated carrier signal is then amplified, demodulated and filtered to provide an output ECG waveform.

The use of transformer coupling and minimization of leakage paths to ground, throughout the monitoring system, minimizes shock hazards and preserves a high common mode signal rejection factor.

Hence, the physiological monitoring system of the present invention provides an accurate, reliable, compact, versatile, and relatively low-cost instrument for monitoring respiration and cardiac action.

The above and other objects and advantages of the invention will become apparent from the following more detailed description, when taken in conjunction with the accompanying drawings of illustrative embodiments thereof.

DESCRIPTION OF THE PREFERRED EMBODIMENT

Figure 1:
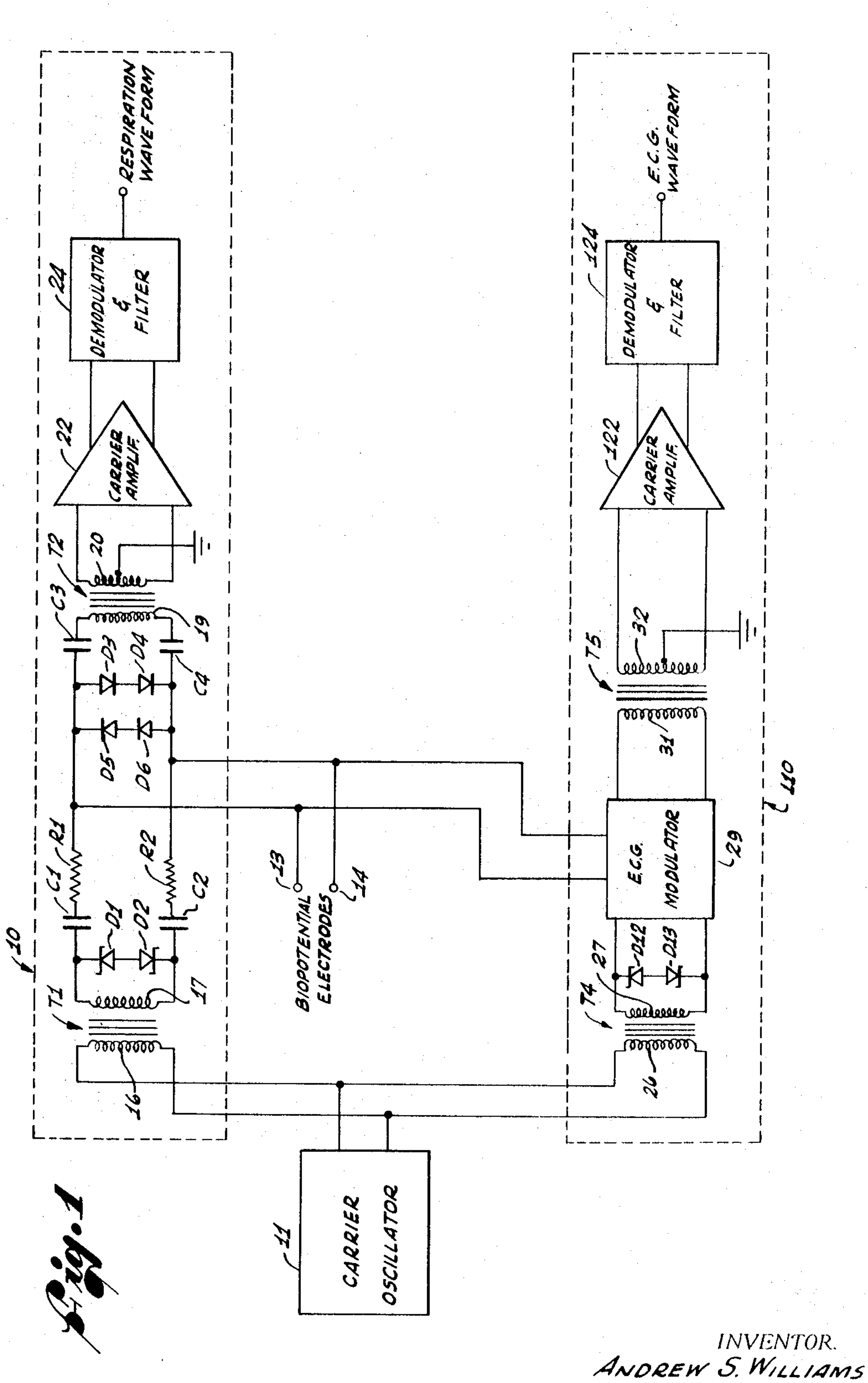
FIG. 1 is a combined block diagram and electrical schematic of a presently preferred embodiment of a combined respiration and cardiac monitoring system in accordance with the present invention.

Referring now to the drawings, and particularly to FIG. 1 thereof, there is shown a combined respiration and cardiac monitoring system capable of providing a pair of electrical outputs representing ECG and respiration waveforms. The monitoring system shown is also capable of providing output information indicating subject base impedance at the carrier frequency employed in the system.

The monitoring system of FIG. 1 basically comprises a respiration channel 10 for providing an output respiration waveform, a cardiac channel 110 for providing an output ECG waveform, a high frequency carrier oscillator 11, and a pair of biopotential electrodes 13, 14. The carrier oscillator 11 and biopotential electrode 13, 14 are common to both the respiration channel 10 and the cardiac channel 110.

The carrier oscillator 11 provides a high frequency electrical output, i.e., at approximately 50 kilohertz, as the carrier frequency at which impedance measurements are made. The selection of 50 kilohertz as the carrier frequency is optimum for bioelectrical measurements, since living tissue is not substantially reactive in a physiological sense at frequencies of this order of magnitude. The oscillator 11 also provides the carrier signal which is ultimately modulated by the ECG signal in the cardiac channel 110.

The biopotential electrodes 13, 14 may take any appropriate form well known in the art, such as silver discs in an appropriate housing or electrodes of the silver-silver chloride type. A typical biopotential electrode of the type found suitable for use with the physiological monitoring system of the present invention is disclosed in copending U.S. application Ser. No. 627,159, filed Mar. 30, 1967, for Biopotential Electrode and Method of Manufacture, and assigned to the same assignee as the present application.

Referring now more particularly to the details of the respiration channel 10, the electrical output from the carrier oscillator 11 is fed to the primary winding 16 of a transformer T1, the secondary winding 17 of which forms part of the subject circuit, the subject (not shown) being located between the pair of biopotential electrodes 13, 14 applied to the chest of the subject.

A pair of voltage regulating devices, such as Zener diodes D1 and D2 connected back-to-back across the secondary winding 17 of transformer T1, render the carrier signal substantially constant in magnitude, e.g., approximately 6 volts peak-to-peak being preferred for most applications.

A pair of resistors R1 and R2, typically 12 kilohms each, are connected in series with the electrodes 13, 14 and the subject to limit maximum current flow. The resistors R1 and R2 are chosen to be large compared with the maximum subject base impedance at the carrier frequency, so that the carrier current through the subject is essentially constant. This provides substantially constant instrument calibration independent of subject base impedance.

In addition, the resistors R1 and R2 cooperate with back-to-back connected pairs of diodes D3, D4 and D5, D6 which limit the maximum voltage across the subject and the electrodes 13, 14 to the forward conduction voltage drop across two diodes, typically of the order of 1.5 volts for a pair of silicon diodes. Of course, it will be appreciated by those of ordinary skill in the art that any number of diodes can be used in accordance with the magnitude of the limiting potential desired. In practice, subject voltage rarely exceeds 0.4 volts peak which is well below physiological sensitivity levels.

Coupling capacitors C1, C2, C3 and C4, each being typically 0.01 microfarads, offer a low impedance at the carrier frequency, yet effectively allow a high impedance to be presented to the subject at ECG frequencies.

The voltage appearing across the subject between the biopotential electrodes 13, 14 varies as the subject breathes because of the tidal volume changes in transthoracic electrical impedance. Hence, the carrier signal is amplitude modulated by these tidal volume impedance changes.

The high frequency carrier voltage across the subject and the biopotential electrodes 13, 14 also appears across the primary winding 19 of a transformer T2, the secondary winding 20 of the transformer T2 providing electrical input to a carrier amplifier 22 having a relatively high input impedance. The carrier amplifier 22 typically has a gain of 12 and provides a balanced output to a demodulator and filter circuit 24.

Figure 2:
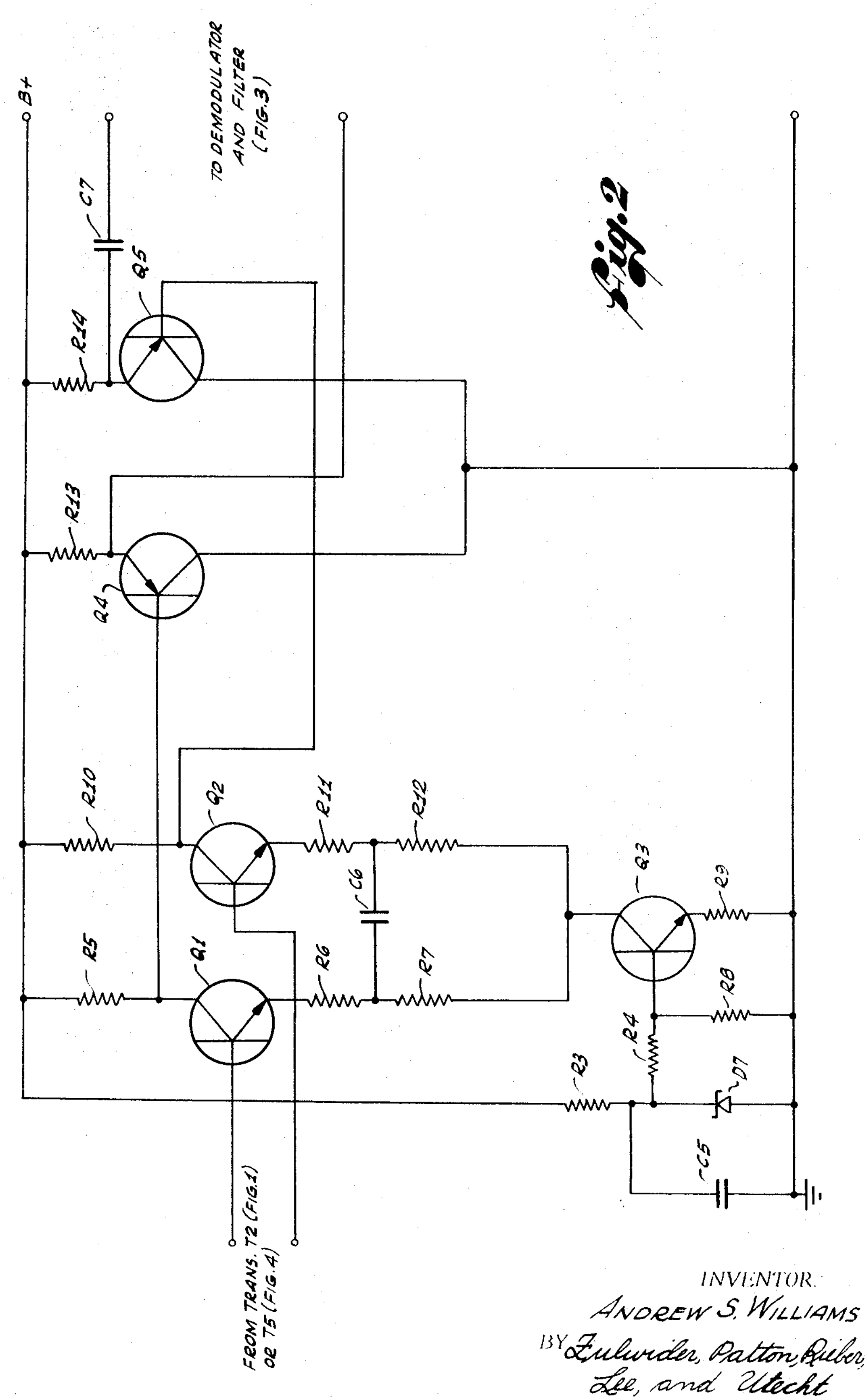
FIG. 2 is an electrical schematic diagram of a typical carrier amplifier of the type used in both the respiration and cardiac channels of the monitoring system shown in FIG. 1.

One embodiment of electrical circuitry suitable for carrying out the necessary functions of the carrier amplifier 22 is illustrated in FIG. 2 in the drawings. In the carrier amplifier circuit shown in FIG. 2, it is necessary to provide the center-tapped secondary winding 20 of the transformer T2 of FIG. 1, in view of the push-pull input required by the transistors Q1 and Q2. Typical component types and values for the carrier amplifier circuit of FIG. 2 are as follows:

R3–3.3 kilohms
R4–3.9 kilohms
R5, R10–4.7 kilohms
R7, R9, R12–270 ohms
R8–1.5 kilohms
R6, R11–390 ohms
R13, R14–1 kilohm
C5, C6–0.1 microfarads
C7–0.47 microfarads
Q1, Q2, Q3–Type 2N3565 Transistors (manufactured by Fairchild Semiconductor, Inc., San Rafael, Calif.)
Q4, Q5–Type 2N3645 Transistors (Fairchild Semiconductor, Inc.)
D7–5.6 volt Zener diode A balanced differential amplifier is provided by the circuit of FIG. 2, the particular circuit configuration featuring a constant current supply for the transistors Q1 and Q2 provided by the transistor Q3. This results in a high common mode rejection factor which prevents unwanted signals between either of the biopotential electrodes 13, 14 and ground from contaminating the desired signal.

Figure 3:
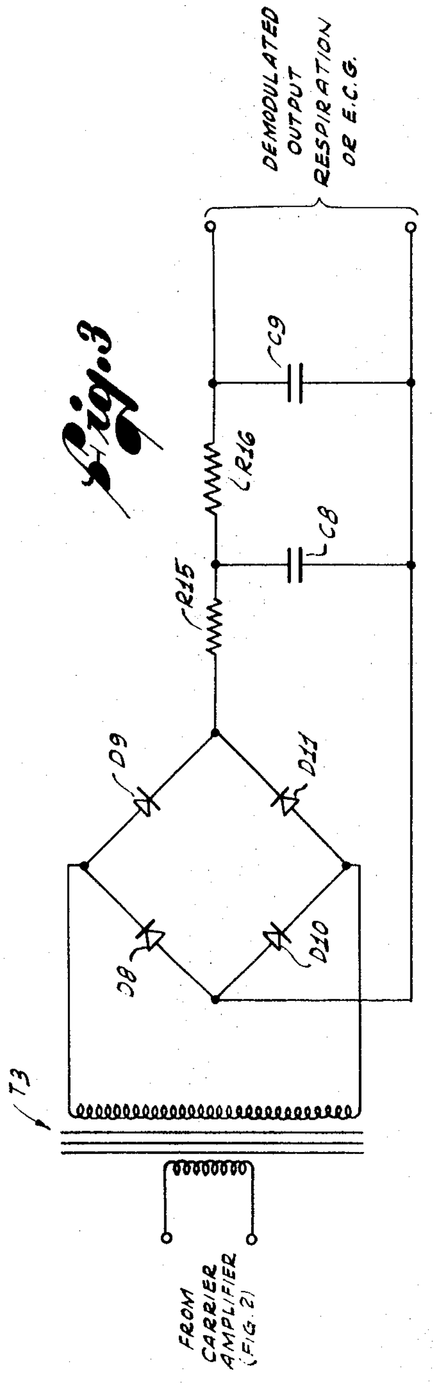
FIG. 3 is an electrical schematic diagram of a demodulator and filter circuit of the type used in both the respiration and cardiac channels of the monitoring system shown in FIG. 1.

The output of the carrier amplifier shown in FIG. 2 is directed as input to a stepup transformer T3 at the input to the demodulator and filter circuit 24 of FIG. 1. In this regard, one embodiment of electrical circuitry suitable for carrying out the necessary functions of the demodulator and filter 24 is shown in FIG. 3 of the drawings.

The transformer T3 has a relatively high stepup ratio, typically 1:6, providing a relatively high voltage drive for the demodulator to obtain maximum output and linearity. In this connection, the demodulator circuitry is comprised of four rectifiers D8, D9, D10 and D11 connected in a conventional full-wave bridge rectifier circuit configuration.

The filter network, receiving the output of the demodulator, includes resistors R15, R16, and capacitors C8, C9 connected to provide two sections of conventional RC ripple filtering. The time constants of the filter network are selected to reject frequencies above the range of interest for the particular physiological function being monitored. For the respiration channel 10, the multiple section filter network typically provides complete rejection of unwanted signals above 3 Hertz. Typical component values for the filter network of FIG. 3, when used in the respiration channel 10, are as follows:

R15–15 kilohms
R16–82 kilohms
C8–1.0 microfarads
C9–1.0 microfarads

The output signal from the filter network of FIG. 3 is the respiration waveform. In addition, the filter output includes a DC component which is proportional to the subject base impedance.

Referring now more particularly to the details of the cardiac channel 110, the electrical output from the carrier oscillator 11 in FIG. 1 is fed to the primary winding 26 of a transformer T4, the secondary winding 27 of which provides a carrier signal input for an ECG modulator circuit 29.

A pair of voltage regulating devices, such as Zener diodes D12 and D13 connected back-to-back across the secondary winding 27 of transformer T4, render the carrier signal substantially constant in magnitude and correspond to the diodes D1 and D2 previously discussed in connection with the respiration channel 10.

Figure 4:
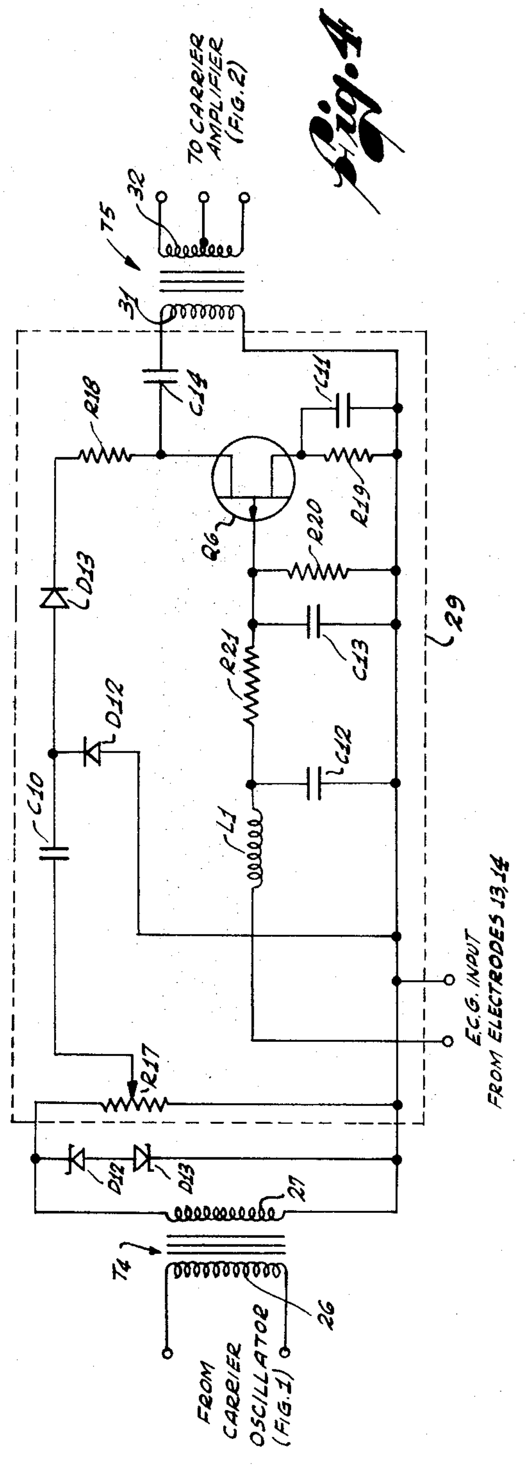
FIG. 4 is an electrical schematic diagram of a modulator circuit used in the cardiac channel of the monitoring system shown in FIG. 1.

Referring now more particularly to FIG. 4 of the drawings, there is shown a presently preferred embodiment of the ECG modulator 29.

A potentiometer R17, connected across the diodes D12 and D13, is used to vary the level of the carrier signal input to the modulator. The attenuated carrier signal from the potentiometer R17 is directed to a pulse forming network comprising capacitor C10 and diodes D12 and D13. The latter pulse forming network forms a pulse train of positive going half wave pulses to the drain circuit of a field effect transistor Q6. The transistor Q6 is preferably of the N-channel type and is provided with a conventional drain resistor R18 and a source resistor R19. The source circuit is DC stabilized by means of a conventional bypass capacitor C11.

The potentiometer R17 is adjusted to provide a level of carrier signal input which enables the transistor Q6 to operate in its linear range.

One of the features of the field effect transistor is that the gate input current is practically zero when suitably biased. This enables an extremely high value of the gate leak resistor R20 to be used, thereby providing a relatively high input impedance at the gate of the transistor Q6.

The net electrical signal voltage between the biopotential electrodes 13, 14 includes not only the ECG potentials, but also the modulated high frequency carrier waveform utilized for subsequent respiration detection. Hence, the ECG signal must first be isolated before it can be usefully employed in the cardiac channel 110.

Filtration of the ECG signal in the gate circuit of the transistor Q6 is accomplished by inductor L1, capacitor C12, resistor R21 and capacitor C13 to provide two stages of LC and RC filtering. Values of the gate input filter components are chosen to provide a high reactance at carrier frequencies while providing essentially minimum attenuation at all low frequencies of interest, i.e., from DC to approximately 100 Hertz. The particular filter network shown also preferably provides a steep rolloff characteristic above approximately 100 Hertz.

Typical component types and values for the ECG modulator 29 of FIG. 4 are as follows:

R17–10 kilohms
R18–470 ohms
R19–27 kilohms
R20–3.3 megohms
R21–10 kilohms
C10–0.1 microfarads
C11–0.047 microfarads
C12, C13–0.01 microfarads
C14–0.1 microfarads
L1–250 millihenries
Q6–type 2N3819 field effect transistor (manufactured by Texas Instruments, Inc., Dallas, Tex.)

The field effect transistor Q6 is operated with a relatively small drain to source potential, i.e., approximately 0.1 volts. Under this condition, the transistor Q6 behaves as a variable resistance in that the drain to source conductance varies linearly with gate to source bias potential. A nominal conductance is established by the self bias provided by components R19 and C11.

The resultant half wave carrier pulse train which develops between the drain and source of the transistor Q6 is applied through a coupling capacitor C14 to the primary winding 31 of a transformer T5. The capacitor C14 provides the necessary DC blocking for the transformer T5 and has a relatively low reactance at the carrier frequency.

The variable ECG signal between the gate and source of transistor Q6 amplitude modulates the carrier pulse train by means of conductance modulation. Since the ECG signal magnitude is rarely in excess of 1 millivolt peak (R-wave), the depth of carrier train modulation is relatively small, typically being approximately 0.5 percent. However, this small modulation depth is sufficient to provide an output ECG waveform possessing a good signal to noise ratio.

The ECG modulated carrier pulse train appearing at the secondary winding 32 of transformer T5 is subsequently amplified by a carrier amplifier 122, the output of the latter amplifier being directed to a demodulator and filter circuit 124 which, in turn, provides an electrical output which is the ECG waveform.

It will be appreciated that the modulator circuit will also function properly if a P-channel field effect transistor is substituted for the N-channel transistor. However, in the event a P-channel transistor is utilized, the drain circuit must be supplied with a negative going pulse train. The latter is accomplished by simply reversing the diodes D12 and D13 in FIG. 4.

The electrical circuitry of the carrier amplifier 122 utilized in the cardiac channel 110 may be identical to the carrier amplifier 22 utilized in the respiration channel 10 and, hence, the amplifier circuitry shown in FIG. 2 of the drawings is equally applicable to both the respiration and the cardiac channels.

The demodulator and filter circuit 124 of the cardiac channel 110 utilizes the same circuit configuration shown in FIG. 3 and previously described in connection with the demodulation and filter circuit 24 used in the respiration channel 10. In this regard, the differences in circuitry reside solely in the values of the time constants and components utilized in the filter network. In the case of the respiration channel 10, values of the filter components are chosen to provide a cutoff frequency of approximately 3 Hertz. In the case of the cardiac channel 110, the values of the filter network components are selected to provide a cutoff frequency of approximately 120 Hertz. In this connection, typical component values for the circuitry of FIG. 3, when utilized in the cardiac channel 110, are as follows:

R15–1 kilohm
R16–47 kilohms
C8–1000 picofarads
C9–3300 picofarads

It will be apparent from FIG. 1 that there are no direct electrical connections between the subject and either the oscillator 11 or the amplifiers 22 and 122. All of the transformers T1, T2, T3, T4 and T5 are designed for very low leakage by keeping the interwinding capacity of the transformers to a minimum. Hence, the stray leakage current to ground at power frequencies is very small, and the subject is thoroughly isolated from auxiliary electrical circuits and from ground to minimize potential shock hazards.

The combined respiration and ECG signal aquisition system of the present invention satisfies a long existing need in the medical arts for a sensitive, accurate, reliable, versatile, and relatively compact, economical and safe apparatus for physiological monitoring of two important basic parameters commonly required by physicians.

It will be apparent from the foregoing that, while a particular form of the invention has been illustrated and described, various modifications can be made without departing from the spirit and scope of the invention. Accordingly, it is not intended that the invention be limited, except as by the appended claims.

I claim:

1. In a system for monitoring the cardiac action of a subject, the combination comprising:

a high frequency source of electrical energy;

a pair of biopotential electrodes adapted to be applied to said subject and to receive as input an unmodulated ECG biopotential signal;

conductance modulation means having first and second inputs, said first input being connected to said biopotential electrodes, said modulation means including a filter for extracting said unmodulated ECG signal indicative of cardiac action from said first input, said modulation means further including a field effect transistor receiving said unmodulated ECG signal as input; and transformer means for coupling a portion of said electrical energy from said high frequency source to said second input of said modulation means, whereby said electrical energy is modulated by said ECG signal, said transformer means having sufficiently low leakage capacitance to ground as to pose substantially no electrical shock hazard to a subject connected to said biopotential electrodes.

2. A combination as set forth in claim 1, and further comprising:

amplifier means;

additional transformer means for coupling the output of said modulation means to the input of said amplifier means, said additional transformer means also having sufficiently low leakage capacitance to ground as to pose substantially no electrical shock hazard to said subject;
demodulator means;
means for coupling the output of said amplifier means to said demodulator means; and
filter means for deriving an ECG signal from the output of said demodulator means.

3. In a system for monitoring the cardiac action of a subject, the combination comprising:
a high frequency source of electrical energy;
conductance modulation means including first and second inputs, said modulation means including a filter for extracting an unmodulated low frequency ECG biopotential signal indicative of cardiac action from said first input, said modulation means further including a field effect transistor receiving said unmodulated ECG signal as input;
means for coupling a portion of said electrical energy from said high frequency source to said second input of said modulation means, whereby said electrical energy is modulated by said low frequency signal;
amplifier means;
means for coupling the output of said modulation means to the input of said amplifier means;
demodulator means;
means for coupling the output of said amplifier means to said demodulator means; and
filter means for deriving a low frequency ECG electrical signal indicative of cardiac action from the output of said demodulator means.

4. In a physiological monitoring apparatus, the combination comprising:
means for receiving a biopotential input;
a high frequency source of electrical energy;

a field effect transistor having a drain, a source and a gate;
means for DC biasing said transistor source;
means for converting a portion of said electrical energy from said high frequency source to a unidirectional half wave pulse train;
resistive means for coupling said pulse train to said transistor drain; and
a low frequency filter connecting between said transistor gate and said means for receiving a biopotential input, whereby the drain-source electrical output from said transistor is a high frequency pulse train conductance modulated by a low frequency signal extracted from the biopotential input.

5. A combination as set forth in claim 4, wherein said transistor is an N-channel device.

6. A combination as set forth in claim 4, wherein said transistor is a P-channel device.

7. A combination as set forth in claim 4, and further including transformer means connected between said high frequency source and said means for converting a portion of said electrical energy, said transformer means having sufficiently low leakage capacitance to ground as to pose substantially no electrical shock hazard to a subject being monitored.

8. A combination as set forth in claim 7, and further including:
amplifier means;
additional transformer means for coupling the conductance modulated electrical output of said transistor to the input of said amplifier means, said additional transformer means also having sufficiently low leakage capacitance to ground as to pose substantially no electrical shock hazard to said subject;
a demodulator;
means for coupling the output of said amplifier means to said demodulator; and
filter means for deriving said low frequency signal from the output of said demodulator.